United States Patent
Han et al.

(10) Patent No.: US 10,268,004 B2
(45) Date of Patent: Apr. 23, 2019

(54) MULTI-CHANNEL RECEIVER OPTICAL SUB-ASSEMBLY AND MANUFACTURING METHOD THEREOF

(71) Applicant: ELECTRONICS AND TELECOMMUNICATIONS RESEARCH INSTITUTE, Daejeon (KR)

(72) Inventors: Young Tak Han, Daejeon (KR); Sang Ho Park, Daejeon (KR); Yong Soon Baek, Daejeon (KR); Jang Uk Shin, Daejeon (KR); Yong Hwan Kwon, Daejeon (KR); Jong Hoi Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/869,226

(22) Filed: Jan. 12, 2018

(65) Prior Publication Data

US 2018/0136419 A1 May 17, 2018

Related U.S. Application Data

(62) Division of application No. 15/203,737, filed on Jul. 6, 2016, now Pat. No. 9,904,023.

(30) Foreign Application Priority Data

Nov. 16, 2015 (KR) .................. 10-2015-0160635

(51) Int. Cl.
*G02B 6/42* (2006.01)
*G02B 6/12* (2006.01)
(Continued)

(52) U.S. Cl.
CPC .......... *G02B 6/4224* (2013.01); *G01J 1/0209* (2013.01); *G01J 1/44* (2013.01);
(Continued)

(58) Field of Classification Search
CPC .......... G02B 6/42; G02B 6/12; G02B 4/42424
(Continued)

(56) References Cited

U.S. PATENT DOCUMENTS

| 5,909,524 | A | * | 6/1999 | Tabuchi | G02B 6/423 385/14 |
| 6,327,407 | B1 | * | 12/2001 | Mitsuda | G02B 6/4239 385/48 |

(Continued)

FOREIGN PATENT DOCUMENTS

| KR | 2000-0031318 A | 6/2000 |
| KR | 10-2009-0025953 A | 3/2009 |

(Continued)

OTHER PUBLICATIONS

Toshihide Yoshimatsu et al., "Compact and high-sensitivity 100-Gb/s (4×25Gb/s) APD-ROSA with a LAN-WDM PLC demultiplexer", Optics Express, vol. 20, No. 26, pp. B393-B398, Dec. 10, 2012.

(Continued)

*Primary Examiner* — Kaveh C Kianni
(74) *Attorney, Agent, or Firm* — Rabin & Berdo, P.C.

(57) ABSTRACT

Provided herein are a multi-channel receiver optical sub-assembly and a manufacturing method thereof. The multi-channel receiver optical sub-assembly includes a PLC chip having a first side into which an optical signal is received and a second side from which the received signal is outputted, with an inclined surface formed on the second side of the PLC chip at a preset angle, a PD carrier bonded onto the PLC chip and made of a glass material, and an SI-PD bonded (Continued)

onto the PD carrier, a lens being integrated therein. The PLC chip, the PD carrier, and the SI-PD are passively aligned by at least one alignment mark and then are bonded.

14 Claims, 6 Drawing Sheets

(51) Int. Cl.
G01J 1/44 (2006.01)
H04B 10/60 (2013.01)
G01J 1/02 (2006.01)
G01J 3/02 (2006.01)

(52) U.S. Cl.
CPC ........ *G01J 3/0259* (2013.01); *G02B 6/12019* (2013.01); *G02B 6/4239* (2013.01); *G02B 6/4257* (2013.01); *G02B 6/4279* (2013.01); *G02B 6/4281* (2013.01); *H04B 10/60* (2013.01); *G01J 2001/444* (2013.01)

(58) Field of Classification Search
USPC .................................................... 384/14, 52
See application file for complete search history.

(56) References Cited

U.S. PATENT DOCUMENTS

| | | | |
|---|---|---|---|
| 6,344,148 B1 | 2/2002 | Park et al. | |
| 6,454,467 B1* | 9/2002 | Ishihara | G02B 6/4246 385/24 |
| 6,690,845 B1* | 2/2004 | Yoshimura | G02B 6/12002 257/E23.01 |
| 6,739,760 B2* | 5/2004 | Cheng | G02B 6/425 385/89 |
| 7,272,274 B1* | 9/2007 | Albers | G02B 6/4452 385/129 |
| 7,999,858 B2* | 8/2011 | Nayar | H04N 5/235 348/221.1 |
| 9,323,065 B2* | 4/2016 | Wang | G02B 27/1006 |
| 9,417,408 B2* | 8/2016 | Kadar-Kallen | G02B 6/4204 |
| 2001/0024553 A1* | 9/2001 | Nakanishi | G02B 6/4239 385/94 |
| 2002/0037143 A1* | 3/2002 | Kuhara | G02B 6/29361 385/94 |
| 2003/0128917 A1* | 7/2003 | Turpin | G02B 6/2861 385/24 |
| 2003/0184753 A1* | 10/2003 | Ogawa | G01S 15/8968 356/432 |
| 2003/0187355 A1* | 10/2003 | Ogawa | A61B 5/0097 600/437 |
| 2004/0033004 A1 | 2/2004 | Welch et al. | |
| 2004/0202417 A1* | 10/2004 | Watanabe | G02B 6/4201 385/33 |
| 2005/0014300 A1* | 1/2005 | Welch | B82Y 20/00 438/17 |
| 2007/0238326 A1* | 10/2007 | Fallah-Adl | H05K 7/1451 439/67 |
| 2008/0037132 A1* | 2/2008 | Naya | G02B 3/0056 359/619 |
| 2009/0009752 A1* | 1/2009 | Duggan | G01D 5/30 356/218 |
| 2009/0046288 A1* | 2/2009 | Crafts | G01J 3/18 356/328 |
| 2010/0119231 A1* | 5/2010 | Kim | G02B 6/1221 398/82 |
| 2011/0013869 A1* | 1/2011 | Pezeshki | G02B 6/32 385/33 |
| 2011/0058771 A1* | 3/2011 | Lee | G02B 6/4215 385/33 |
| 2011/0158272 A1* | 6/2011 | Pezeshki | H01S 5/4087 372/38.02 |
| 2012/0105812 A1* | 5/2012 | Dekker | G03B 21/2033 353/31 |
| 2012/0114293 A1 | 5/2012 | Choe et al. | |
| 2013/0148970 A1 | 6/2013 | Nakajima et al. | |
| 2014/0183344 A1* | 7/2014 | Lee | G02B 6/4214 250/227.24 |
| 2015/0001581 A1* | 1/2015 | Oda | H01L 31/02327 257/186 |
| 2015/0023632 A1* | 1/2015 | Lan | G02B 6/4274 385/14 |
| 2015/0229400 A1* | 8/2015 | Oguma | G02B 6/12011 398/79 |
| 2015/0243824 A1 | 8/2015 | Bhat et al. | |
| 2016/0149662 A1* | 5/2016 | Soldano | G02B 6/30 398/51 |
| 2016/0273034 A1* | 9/2016 | Lundquist | C12Q 1/6874 |
| 2018/0091250 A1* | 3/2018 | Soldano | G02B 6/34 |

FOREIGN PATENT DOCUMENTS

KR 10-2012-0048258 A 5/2012
WO WO-2009/031744 A1 3/2009

OTHER PUBLICATIONS

Joon Ki Lee et al., "Analysis of dimensional tolerance for an optical demultiplexer of a highly alignment tolerant 4×25 Gbs ROSA module", Optics Express, vol. 22, No. 4, pp. 4307-4315, Feb. 24, 2014.
Young Tak Han et al., "Compact ROSA based on PLC hybrid integration for CFP4 100G transceiver", The 23rd Conference on Optoelectronics and Optical Communications, Jun. 1, 2016.

* cited by examiner

MULTI-CHANNEL RECEIVER OPTICAL SUB-ASSEMBLY AND MANUFACTURING METHOD THEREOF

CROSS-REFERENCE TO RELATED APPLICATIONS

This is a divisional application of U.S. patent application Ser. No. 15/203,737, filed on Jul. 6, 2016. Further, this patent application claims priority to Korean patent application number 10-2015-0160635 filed on Nov. 16, 2015. The entire contents of these prior U.S. and Korean applications are hereby incorporated by reference.

BACKGROUND

Field of Invention

Various embodiments of the present disclosure relate to a multi-channel receiver optical sub-assembly and a manufacturing method thereof.

Description of Related Art

As broadband mobiles, clouding networks, IPTVs and smart-phones are spreaded, video-based high-capacity communications are explosively increased. Thus, a transmission rate of an optical module is dramatically increased, and simultaneously, there is an urgent need for technology that may implement a receiver optical sub-assembly in a very small size and at a low cost.

Generally, when the receiver optical sub-assembly uses an AWG (Arrayed Waveguide Grating) PLC (Planar Lightwave Circuit) chip having a function of wavelength multiplexing filter, or a PLC chip on which a multi-channel straight waveguide is formed, first, one end of the PLC chip is vertically 90° polished so as to implement a light receiving part on one end of the PLC chip. Subsequently, an SI-PD (Surface-Illuminated Photo Diode) on which the lens is not integrated is precisely flip-chip bonded to a top of a PD (Photo Diode) carrier.

Therefore, in order to effectively couple an optical signal outputted from the PLC chip with the SI-PD, the PLC chip that is vertically polished at one end thereof and the PD carrier on which the SI-PD is integrated are arranged to face each other. In this state, a bulky glass lens is inserted between the PLC chip and the SI-PD so that the PLC chip and the SI-PD are horizontally arranged. Thereafter, active alignment and butt-coupling should be performed between the PLC chip and the SI-PD.

In the case of an SI-PD for optical communication of 25 Gbps or more, the diameter of a light receiving part of the SI-PD is very small, that is, about 20 um, so that it is very difficult to passively align the SI-PD with the PLC chip. That is, in the case where the SI-PD, the glass lens, and the PLC chip are discretely passively aligned with each other, if the misalignment of about 10 um occurs for the narrow light receiving part of the SI-PD, optical coupling efficiency between the SI-PD and the PLC chip is remarkably lowered. Therefore, the PLC and the SI-PD should be actively aligned with each other.

Accordingly, if the PLC chip and the SI-PD are actively aligned with each other, the lens is disposed between the SI-PD and the PLC chip as described above, so as to enhance optical coupling efficiency and a yield. In this respect, since the conventional light receiving part should use a glass lens with a large size, the length of the light receiving part is increased. Further, after the PLC chip, the lens, and the SI-PD are discretely arranged, they should be actively aligned and assembled with each other. Thus, a process is complicated and a long time is required, so that it is difficult to achieve a reduction in cost of the receiver optical sub-assembly.

In the conventional receiver optical sub-assembly, the SI-PD is disposed on a side of the PD carrier, and a TIA array amplifying a photo-current, outputted from the SI-PD, to a high voltage is disposed on a top of the PD carrier. Therefore, a high frequency transmission line between the SI-PD and the TIA array is bent at 90°. At this time, if a high speed signal of 25 Gbps or more passes through the high frequency transmission line that is bent at 90°, severe impedance mismatch occurs and a high frequency signal is radiated, so that the performance of the receiver optical sub-assembly is considerably deteriorated.

Consequently, in the related art, when the receiver optical sub-assembly of 25 Gbps or more is mass-produced, production yield is reduced in terms of high frequency characteristics, thus making it very difficult to achieve a reduction in cost of the receiver optical sub-assembly. Particularly, in a receiver optical sub-assembly of 40 Gbps or more, deterioration in high frequency characteristics becomes more serious. Therefore, in the related art, another structure should be applied to the receiver optical sub-assembly of 40 Gbps or more. As a result, it is impossible to use the conventional receiver optical sub-assembly as a universal structure of a receiver optical sub-assembly for a high frequency.

SUMMARY

Various embodiments of the present disclosure are directed to a multi-channel receiver optical sub-assembly (ROSA) implemented by passive alignment and a manufacturing method thereof.

The present disclosure provides a multi-channel receiver optical sub-assembly including a PLC chip having a first side into which an optical signal is received and a second side from which the received signal is outputted, with an inclined surface formed on the second side of the PLC chip at a preset angle; a PD carrier bonded onto the PLC chip and made of a glass material; and an SI-PD bonded onto the PD carrier, a lens being integrated therein, wherein the PLC chip, the PD carrier, and the SI-PD may be passively aligned by at least one alignment mark and then may be bonded.

Furthermore, the present disclosure provides a method of manufacturing a multi-channel receiver optical sub-assembly, including forming an inclined surface at a preset angle on a side of a PLC chip from which an optical signal is outputted; passively aligning and bonding an SI-PD onto a PD carrier of a glass material, a lens being integrated onto a bottom surface of the SI-PD; and passively aligning and bonding the PD carrier onto the PLC chip, wherein the PLC chip, the PD carrier and the SI-PD may be passively aligned and bonded by at least one alignment mark.

DETAILED DESCRIPTION

When it is determined that the detailed description of the related art may obscure the gist of the present invention, the detailed description thereof will be omitted herein.

It should be understood that in this specification, "connected/coupled" refers to one component not only directly coupling another component but also indirectly coupling another component through an intermediate component.

Further, "include" or "may include" used in the specification represents that one or more components, steps, operations, and elements exist or are added. Furthermore, "include" or "have" used in the specification is only used for the purpose of representing features, figures, steps, operations, components, parts or combinations described in the specification, but should not be construed as limiting the existence or addition of one or more other features, figures, steps, operations, components, parts or combinations thereof.

A singular form may include a plural from as long as it is not specifically mentioned in a sentence.

Hereinafter, embodiments will be described in greater detail with reference to the accompanying drawings.

Figure 1:
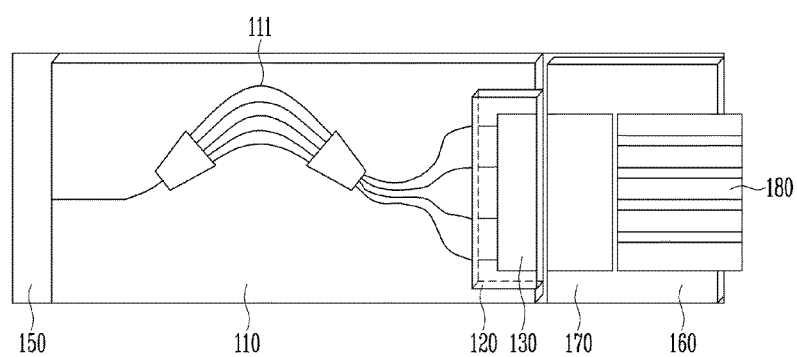
FIG. 1 is a view illustrating a structure of a multi-channel receiver optical sub-assembly using an AWG PLC chip according to a first embodiment of the present disclosure.
Figure 2:
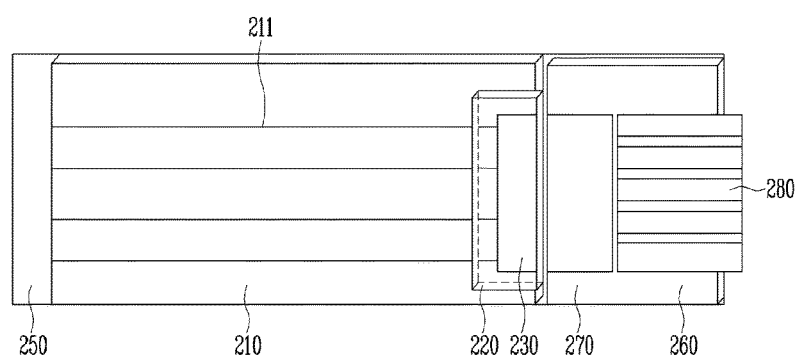
FIG. 2 is a view illustrating a structure of a multi-channel receiver optical sub-assembly using a multi-channel straight waveguide PLC chip according to a second embodiment of the present disclosure.

FIG. 1 is a view illustrating a structure of a multi-channel receiver optical sub-assembly using an AWG PLC chip according to a first embodiment of the present disclosure, and FIG. 2 is a view illustrating a structure of a multi-channel receiver optical sub-assembly using a multi-channel linear waveguide PLC chip according to a second embodiment of the present disclosure.

Since a general structure of a multi-channel receiver optical sub-assembly 200 according to the second embodiment of this disclosure illustrated in FIG. 2 remains the same as the first embodiment of this disclosure except for the kind of a PLC chip 210, the structure of the multi-channel receiver optical sub-assembly 100 according to this disclosure will be described below with reference to the embodiment of FIG. 1.

Referring to FIG. 1, the multi-channel receiver optical sub-assembly 100 according to the first embodiment of the present disclosure may include a PLC chip 110, a PD carrier 120, and an SI-PD 130.

The PLC chip 110 may be an AWG PLC chip with a function of a wavelength multiplexing filter. As described above, in the second embodiment of this disclosure, the PLC chip 210 may be a multi-channel straight waveguide PLC chip.

A multi-channel optical waveguide 111 may be formed on the PLC chip 110, and a material of the optical waveguide may be silica, polymer, silicone and the like.

One side of the PLC chip 110 is coupled with an optical fiber. As illustrated in FIG. 1, when the PLC chip 110 is the AWG PLC chip, a single channel optical fiber is coupled with the PLC chip 110 through a lens, and a single channel optical fiber block may be coupled with the PLC chip 110 through pig-tailing. When the PLC chip 110 is the multi-channel straight waveguide PLC chip as illustrated in FIG. 2, the multi-channel optical fiber block may be coupled with the PLC chip 110 through pig-tailing.

An optical signal incident into the PLC chip 110 from the optical fiber may be traveled (propagated) along the optical waveguide 111 to the other side of the PLC chip 110.

Figure 3:
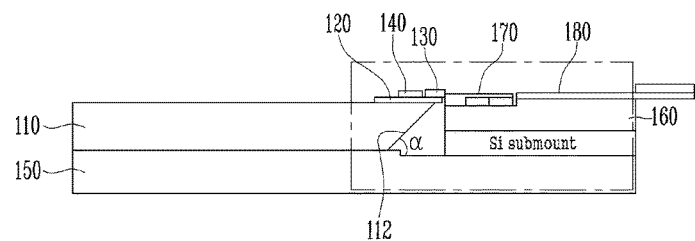
FIG. 3 is a view illustrating a sectional structure of the receiver optical sub-assembly according to the present disclosure.
Figure 4:
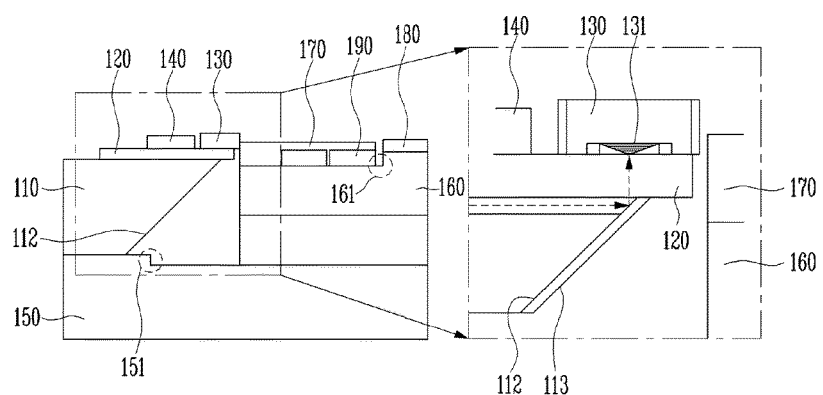
FIG. 4 is a detailed view illustrating a structure of a light receiving part in the receiver optical sub-assembly according to the present disclosure.

As illustrated in FIGS. 3 and 4, the other side of the PLC chip 110 is formed as an inclined surface 112 having a preset inclination angle with respect to a bottom surface of the PLC chip 110. In various embodiments of the present disclosure, the inclination angle may be 45°, and the inclined surface 112 may be formed by a polishing or etching process. As illustrated in FIG. 4, the optical signal reaching the other side of the PLC chip 110 along the optical waveguide 111 is reflected from the inclined surface 112, and then a travel direction thereof is bent at 90°. Thus, the optical signal propagated horizontally along the top surface of the PLC chip 110 is vertically reflected while passing through the inclined surface 112.

In an embodiment, a metal coated layer 113 may be formed on the inclined surface. The metal coated layer 113 may be composed of Cr/Au, Cr/Ni/Au, Ti/Pt/Au or the like. The metal coated layer 113 may act as a reflection mirror that minimizes the scattering of the optical signal reflected from the inclined surface 112, by maximizing the reflection efficiency of the optical signal.

The above-mentioned structure of the PLC chip 110 allows the multi-channel receiver optical sub-assembly 100 according to the present disclosure to change an optical path without using a high frequency transmission line bent at 90° as in the related art, thus minimizing an optical coupling loss between the PLC chip 100 and an SI-PD 130 that will be described below without deteriorating the high frequency characteristics. Thus, the receiver optical sub-assembly according to this disclosure may provide optimized high frequency characteristics to a receiver optical sub-assembly of 25 Gbps or more.

The PD carrier 120 is bonded to the top surface of the PLC chip 110. In various embodiments of the present disclosure, the PD carrier 120 may be formed of a flat glass material that may transmit light without a loss. To be more specific, the PD carrier 120 may be formed from Quartz, sodalime glass, BK7 glass or the like having excellent light transmittance. In various embodiments, the thickness of the glass material forming the PD carrier 120 may range from 100 to 150 um.

The PD carrier 120 is secured to the top surface of the PLC chip 110 by passive alignment and epoxy bonding. As illustrated in FIG. 3, the PD carrier 120 may be bonded to a region of the top surface of the PLC chip 110 on which the inclined surface 112 is formed. Epoxy applied to the top surface of the PLC chip 110 and the PD carrier 120 is excellent in light transmittance, and should have index matching characteristics that are similar to the glass material forming the optical waveguide 111 and the PD carrier 120. Therefore, epoxy may be named as index matching epoxy.

In various embodiments, the SI-PD 130 into which a lens 131 that will be described later has been integrated is first bonded to the PD carrier 120, and the PD carrier 120 to which the SI-PD 130 has been bonded may be bonded to the PLC chip 110. A method of passively aligning the PLC chip 110 with the PD carrier 120 will be described below in detail.

The optical signal that is reflected from the inclined surface 112 of the PLC chip 110 and then is vertically outputted is diverged while passing through a clad layer of the optical waveguide 111, the epoxy of the PD carrier 120, and the PD carrier 120.

Generally, if a vertical surface is formed on the other side of the PLC chip 110, it is problematic in that the horizontally propagated optical signal is reflected from the vertical surface and then is coupled to and fed back to the optical waveguide 111. However, in the multi-channel receiver optical sub-assembly 100 according to this disclosure, the optical signal is reflected from the inclined surface 112, is vertically propagated, and is diverged while passing through the PD carrier 120. Thus, the optical signal reflected from an upper surface of the PD carrier 120 is not reversely coupled with the optical waveguide 111.

Therefore, in the multi-channel receiver optical sub-assembly 100 according to this disclosure, AR coating is not required on the surfaces of the PLC chip 110 and the PD carrier 120, so that a processing cost is reduced.

The SI-PD 130 is bonded to the top surface of the PD carrier 120. In various embodiments of the disclosure, the SI-PD 130 may be a PIN-PD (PIN Photo-Diode) or an Avalanche PD (Avalanche Photo-Diode; APD). The SI-PD 130 is fixed to the top surface of the PD carrier 120 by passive alignment and flip-chip bonding. According to an embodiment, if the SI-PD 130 is a discrete chip type, the SI-PD 130 may be fixed by flip-chip bonding. If the SI-PD 130 is an array chip type, the SI-PD 130 may be fixed by die bonding or flip-chip bonding. A method of passively aligning the PD carrier 120 with the SI-PD 130 into which the lens 131 is integrated will be described below in detail.

In various embodiments of this disclosure, the lens 131 is integrated into the bottom surface of the SI-PD 130, as illustrated in FIG. 4. The lens 131 plays an important role in optical coupling efficiency of the PLC chip 110 with the SI-PD 130. Therefore, the lens 131 should be precisely monolithic-integrated into the SI-PD 130.

In this disclosure, when the lens 131 is monolithic-integrated into the SI-PD 130, the refractive index of the SI-PD 130 into which the lens 131 is integrated is about 3.2 and high, so that it is possible to form the lens 131 with a small radius of curvature. Further, the lens 131 with a small radius of curvature may be easily arranged with the precision of about 1 um using a photomask contact aligner that is employed during a semiconductor process. Therefore, according to this disclosure, the photomask contact aligner is employed during the manufacture of the SI-PD 130, thus allowing the lens 131 to be easily passively aligned with and integrated into the SI-PD 130.

In various embodiments of this disclosure, AR coating may be applied to a surface of the lens 131 integrated into the bottom surface of the SI-PD 130. The AR coating prevents the module characteristics of the multi-channel receiver optical sub-assembly 100 from being deteriorated by optical reflection. The AR coating process is a routine process for manufacturing the SI-PD 130. Thus, when the multi-channel receiver optical sub-assembly 100 according to this disclosure is manufactured, manufacturing cost is not increased by the AR coating on the surface of the lens 131.

As illustrated in FIGS. 3 and 4, a first SLC (Single Layer Capacitor) 140 may be further bonded to the top surface of the PD carrier 120 to be adjacent to the SI-PD 130, thus removing a power supply noise of the SI-PD 130.

The PLC chip 110, the PD carrier 120, and the SI-PD 130 may be mounted on a first metal optical bench (Metal Optical Bench; MOB) 150. A second metal optical bench 160 may be mounted on the first metal optical bench 150 to be adjacent to the inclined surface 112 of the PLC chip 110. In order to electrically insulate the first metal optical bench 150 from the second metal optical bench 160, a (high resistance) submount having high specific resistance may be inserted between the first metal optical bench 150 and the second metal optical bench 160.

In the multi-channel receiver optical sub-assembly 100 according to this disclosure, the second metal optical bench 160 serves as an RF GND, and the first metal optical bench 150 is connected with a metal housing via silver paste. If the first metal optical bench 150 is electrically connected with the second metal optical bench 160, the RF GND is connected with the metal housing. Thus, when the multi-channel receiver optical sub-assembly 100 is handled, the SI-PD 130 and a TIA array 170 are vulnerable to an ESD (electro-static discharge). Therefore, in the multi-channel receiver optical sub-assembly 100 according to this disclosure, the first metal optical bench 150 is electrically isolated from the second metal optical bench 160 by the high resistance submount.

The TIA array 170, an RF-FPCB 180, and a second SLC 190 may be further mounted on the second metal optical bench 160. The TIA array 170 converts and amplifies a photocurrent, outputted from the SI-PD 130, into high frequency voltage. The RF-FPCB 180 transmits the high frequency voltage, outputted from the TIA array 170, into another device. The second SLC 190 removes the power supply noise of the TIA array 170.

Here, the SI-PD 130, the TIA array 170, and the RF-FPCB 180 are arranged to be parallel to each other. As illustrated in FIG. 4, the first metal optical bench 150 may include a step 151 in a region on which the second metal optical bench 160 is mounted so that the SI-PD 130 provided on the first metal optical bench 150 is arranged to be parallel with the TIA array 170 and the RF-FPCB 180 provided on the second metal optical bench 160. Likewise, the second metal optical bench 160 may also include a step 161, as illustrated in FIG. 4, so that the TIA array 170 and the RF-FPCB 180 are arranged to be parallel to each other.

Hereinafter, the structure of aligning the PLC chip 110, the PD carrier 120, and the SI-PD 130 with each other will be described in detail with reference to FIGS. 5 to 8.

Figure 5:
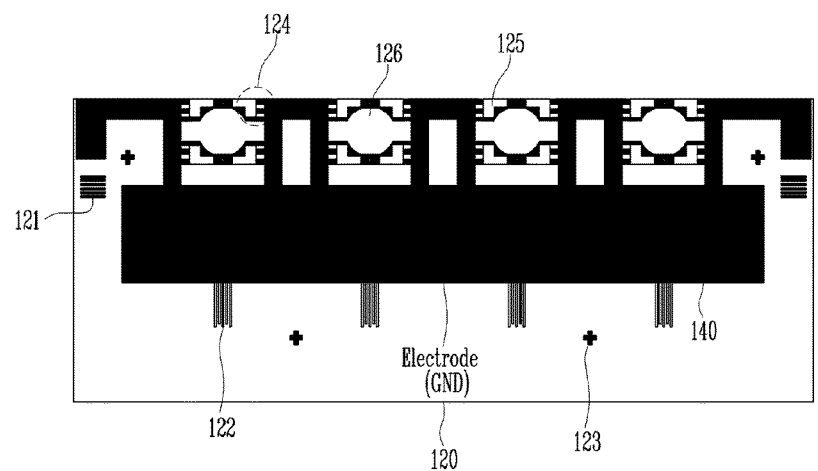
FIG. 5 is a view illustrating a structure of a top surface of a PD carrier in the receiver optical sub-assembly according to the present disclosure.

FIG. 5 is a view illustrating the structure of the top surface of the PD carrier in the receiver optical sub-assembly according to the present disclosure.

Referring to FIG. 5, the PD carrier 120 may include on the top surface thereof a plurality of PDC alignment marks 121, 122 and 123 for performing alignment with the PLC chip 110, a flip-chip bonding alignment mark 124 for performing alignment with the SI-PD 130, and solder 125. The solder 125 may be composed of AuSn, AgSn, SnPb or the like. Further, in order to allow the optical signal to be transmitted through the PD carrier 120 and effectively coupled to the lens 131 integrated into the bottom surface of the SI-PD 130, a metal pattern 126 that is open to have the same shape as the lens 131 is formed on an upper portion of the PD carrier 120.

The alignment mark may include the PDC longitudinal alignment mark 121 for performing the longitudinal alignment of the PD carrier 120 with the PLC chip 110. The PDC longitudinal alignment mark 121 may have various shapes. In an embodiment, as illustrated in FIG. 5, the PDC longitudinal alignment marks may be formed on left and right sides of the PD carrier 120 at 10 um pattern/distance.

Further, the alignment mark may include a PDC transverse alignment mark 122 for performing the transverse alignment of the PD carrier 120 with the optical waveguide 111 formed on the PLC chip 110. The PDC transverse alignment mark 122 may have various shapes. In an embodiment, as illustrated in FIG. 5, the PDC transverse alignment marks may be formed on four places of the PD carrier 120 at 10 um pattern/distance.

FIG. 5 illustrate an example where cross-shaped PDC transverse/longitudinal alignment marks 123 are formed on the left and right sides of the PD carrier 120 to be located between second and third SI-PDs 130 and PDC transverse alignment marks 122. The PD carrier 120 may be more precisely aligned with the PLC chip 110 by the PDC transverse/longitudinal alignment marks 123.

The flip-chip bonding alignment mark 124 is formed in a region where the SI-PD 130 is disposed, and is aligned with an electrode pattern formed on a bottom surface of the SI-PD 130 to allow the SI-PD 130 to be correctly bonded to the top surface of the PD carrier 120.

A large GND pattern is formed on a remaining top surface where the SI-PD 130 on the PD carrier 120 is not bonded to be connected with the GND of the TIA array 170, the RF-FPCB 180, and the second SLC 190.

Figure 6:
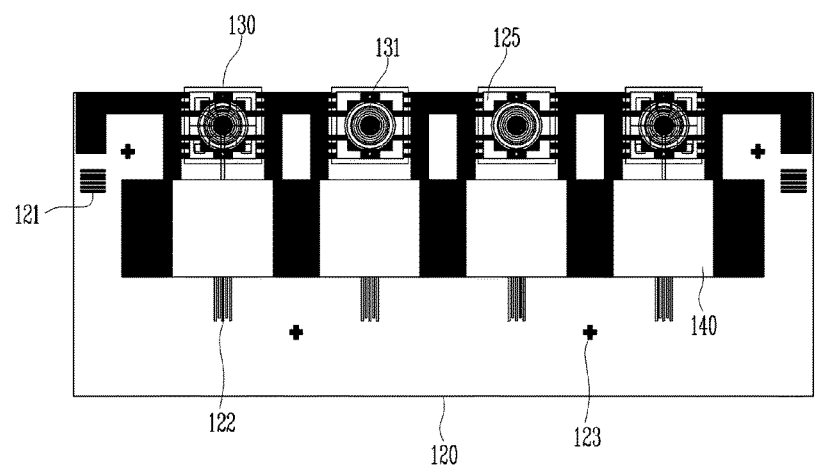
FIG. 6 is a view illustrating a structure in which an SI-PD and an SLC are bonded to the top surface of the PD carrier of FIG. 5.

FIG. 6 is a view illustrating a structure in which the SI-PD and the SLC are bonded to the top surface of the PD carrier of FIG. 5.

The electrode pattern bonded to the flip-chip bonding alignment mark 124 formed on the top surface of the PD carrier 120 is formed on the bottom surface of the SI-PD 130. The electrode pattern formed on the bottom surface of the SI-PD 130 and the flip-chip bonding alignment mark 124 of the PD carrier 120 are passively aligned with a precision of about 2 to 3 um and then are flip-chip bonded. The misalignment of 2 to 3 um rarely affects optical coupling between the SI-PD 130 and the PLC chip 110.

FIG. 6 illustrates an example where four SI-PDs 130 are flip-chip bonded, respectively, and the flip-chip bonding is applied four times in total. However, in the case of using the array type of SI-PD, die bonding by the passive alignment may be applied instead of the flip-chip bonding or the flip-chip bonding may be applied only once to bond the SI-PD 130 to the PD carrier 120.

In a remaining region in the top surface of the PD carrier 120 where the SI-PD 130 is not flip-chip bonded, the GND of the PD carrier 120 is formed, and the first SLC 140 for removing the power supply noise of the SI-PD 130 may be attached to the top of the GND using silver paste.

Figure 7:
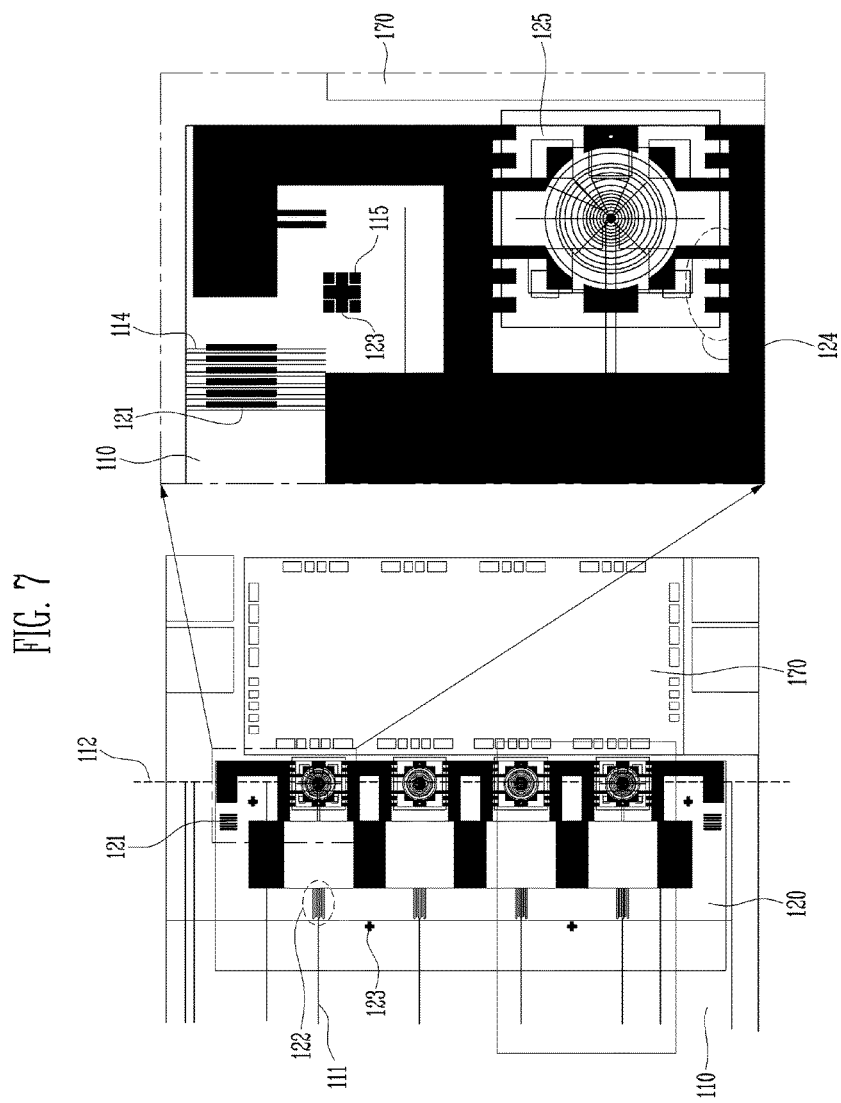
FIG. 7 is a view illustrating a structure in which the PD carrier is bonded to a top surface of the PLC chip in the receiver optical sub-assembly according to the present disclosure.

FIG. 7 is a view illustrating the structure in which the PD carrier is bonded to the top surface of the PLC chip in the receiver optical sub-assembly according to the present disclosure.

A plurality of alignment marks 114 and 115 may be formed on the top surface of the PLC chip 110 to perform the alignment with the PD carrier 120.

The alignment mark may include the PLC longitudinal alignment mark 114 that is aligned with the PDC longitudinal alignment mark 121 formed on the PD carrier 120. The PLC longitudinal alignment mark 114 may have various shapes. In an embodiment, as illustrated in FIG. 7, the PLC longitudinal alignment marks may be formed on left and right sides of the top surface of the PLC chip 110 at 10 um pattern/distance. The PLC longitudinal alignment mark 114 is aligned with the PDC longitudinal alignment mark 121 with the precision of about 5 um. It is possible to check whether they are misaligned or not.

The multi-channel optical waveguide 111 formed on the top of the PLC chip 110 is aligned with the PDC transverse alignment marks 122 formed at 10 um pattern/distance and may be aligned with the precision of 5 um.

Figure 8:
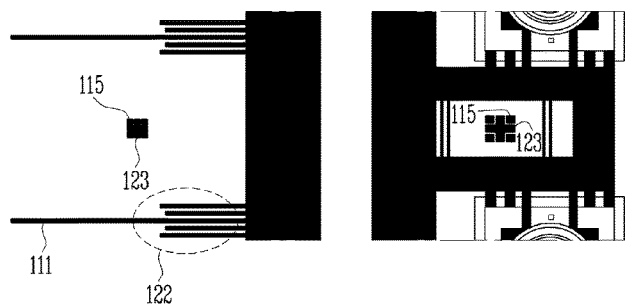
FIG. 8 is an enlarged detailed view of FIG. 7.

FIG. 8 illustrates an example where the cross-shaped PLC transverse/longitudinal alignment mark 115 is formed at a position corresponding to the PDC transverse/longitudinal alignment mark 123. The PD carrier 120 may be more precisely aligned with the PLC chip 110 by the PLC transverse/longitudinal alignment mark 115. The PLC transverse/longitudinal alignment mark 115 and the PDC transverse/longitudinal alignment mark 123 are aligned with each other with a precision of about 5 um. It is possible to check whether they are misaligned or not.

The PLC chip 110 and the PD carrier 120 may be bonded within a misalignment range of 10 um or less by the passive alignment using the above-described alignment marks and may be bonded by using index matching transparent epoxy.

Referring to FIG. 7, the TIA array 170 is placed at a distance of 100 urn or less from the SI-PD 130, thus minimizing the length of the wire bonding. The second SLCs 190 for removing the power supply noise of the TIA array 170 are disposed on the upper and lower surfaces of the TIA array 170.

Figure 9:
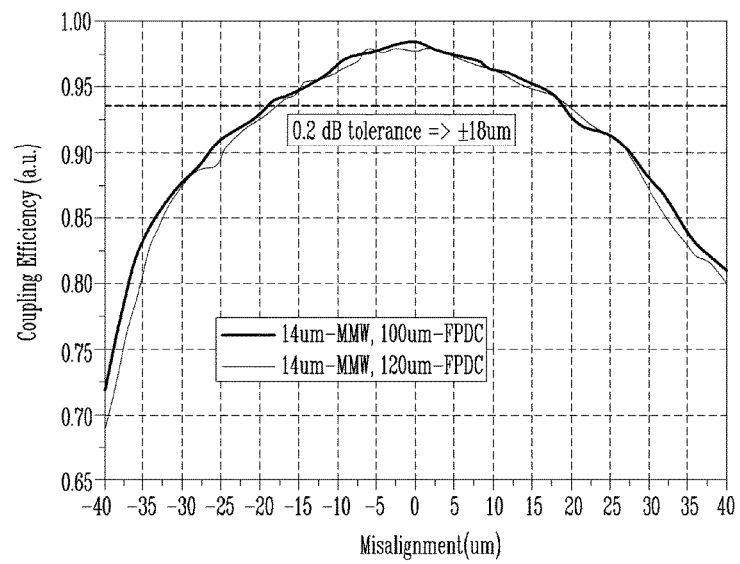
FIG. 9 is a view illustrating simulation results of optical coupling efficiency between the PD carrier onto which the SI-PD is integrated and the PLC chip in the receiver optical sub-assembly according to the present disclosure.

FIG. 9 is a view illustrating simulation results of optical coupling efficiency between the PD carrier into which the SI-PD is integrated and the PLC chip in the receiver optical sub-assembly according to the present disclosure.

In the simulation of FIG. 9, the diameter of a light receiving part of the SI-PD 130 is 24 um, the radius of curvature of the lens 131 is 105 um, the effective receiving diameter of the lens 131 is 100 um, and the chip thickness of the SI-PD 130 is 150 urn. The optical waveguide 111 of the PLC chip 110 is made of silica, has an index contrast of 2%-Δ, and is 14 um and 2.5 um in width and height, respectively. The refractive index of the PD carrier 120 is 1.457, and the refractive index of the index matching transparent epoxy used to bond the PD carrier 120 to the PLC chip 110 is 1.465.

FIG. 9 illustrates the simulation results when the thickness of the PD carrier 120 is 100 um and 120 um, respectively, and a 3D BPM (beam propagation method) is employed.

As illustrated in FIG. 9, when misalignment between the PD carrier 120 and the optical waveguide 111 occurs by +/−18 um, the optical coupling efficiency is 93%, and an optical loss for the maximum optical coupling efficiency (97.5%) is only 0.2 dB.

Meanwhile, when the PLC chip 110 and the PD carrier 120 are passively aligned with each other, experiments showed that the occurring misalignment is about 10 to 15 um. That is, it can be seen that the passive alignment between the PD carrier 120 to which the SI-PD 130 is flip-chip bonded and the PLC chip 110 is sufficiently possible, if 0.2 dB tolerance is about +/−18 um.

Figure 10:
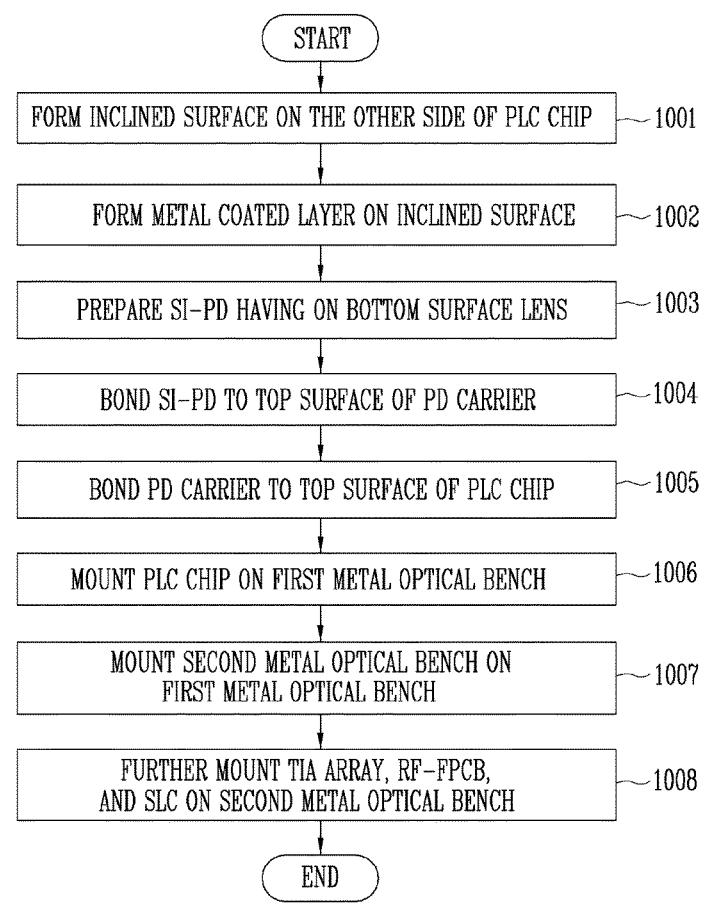
FIG. 10 is a flowchart illustrating a method of manufacturing a multi-channel receiver optical sub-assembly according to the present disclosure.

FIG. 10 is a flowchart illustrating a method of manufacturing a multi-channel receiver optical sub-assembly according to the present disclosure.

Referring to FIG. 10, according to this disclosure, first, the inclined surface 112 is formed on the other side of the PLC chip 110 (1001). The PLC chip 110 has on the top surface thereof the AWG or multi-channel straight optical waveguide, and the optical signal incident into one end is transmitted along the optical waveguide and then is outputted from the other side. In this disclosure, the inclined surface 112 is formed on the other side of the PLC chip 110 so that the other side of the PLC chip 110 has a preset inclination angle (specifically 45°) with respect to the bottom surface. The inclined surface 112 may be formed by the polishing or etching process.

According to this disclosure, the metal coated layer 113 is formed on the inclined surface 112 (1002). The metal coated layer 113 may be composed of Cr/Au, Cr/Ni/Au, Ti/Pt/Au or the like.

According to this disclosure, the SI-PD 130 having on the bottom surface thereof the lens is prepared (1003). Here, the lens 131 may be monolithic-integrated into the bottom surface of the SI-PD 130 using the photomask contact aligner. In various embodiments, the AR coating may be applied to the surface of the lens 131.

Next, in this disclosure, the SI-PD 130 into which the lens 131 is integrated is bonded to the top surface of the PD carrier 120 (1004). Here, the SI-PD 130 and the PD carrier 120 are passively aligned using the plurality of alignment marks formed on the SI-PD 130 and the PD carrier 120, and are bonded by flip-chip bonding.

Further, in this disclosure, the first SLC 140 for removing the power supply noise of the SI-PD 130 may be bonded to the top surface of the PD carrier 120.

Subsequently, according to this disclosure, the PD carrier 120 to which the SI-PD 130 is bonded is bonded to the top surface of the PLC chip 110 (1005). Here, the PLC chip 110 and the PD carrier 120 are passively aligned using the plurality of alignment marks formed on the PLC chip 110 and the PD carrier 120, and are bonded by epoxy.

Next, in this disclosure, the PLC chip 110 to which the PD carrier 120 is bonded is mounted on the first metal optical bench 150 (1006).

Thereafter, according to this disclosure, the second metal optical bench 160 is further mounted on the first metal optical bench 150 (1007). Here, the second metal optical bench 160 may be mounted on the first metal optical bench 150 to be adjacent to the PLC chip 110, and the high resistance submount may be inserted between the first metal optical bench 150 and the second metal optical bench 160.

Next, in this disclosure, the TIA array 170, the RF-FPCB 180, and the second SLC 190 for removing the power supply noise of the TIA array 170 are further mounted on the second metal optical bench 160 (1008). Here, the TIA array 170 and the RF-FPCB 180 may be mounted to be parallel with the SI-PD 130.

In the multi-channel receiver optical sub-assembly according to this disclosure, the passive alignment makes it possible to implement the receiver optical sub-assembly in a very small size and at a low cost.

To be more specific, the multi-channel receiver optical sub-assembly according to this disclosure substitutes for the conventional receiver optical sub-assembly packaging structure that is complicated and expensive due to the active alignment between the SI-PD, the lens, and the PLC chip, thus being capable of reducing the manufacturing cost of the receiver optical sub-assembly.

Further, the multi-channel receiver optical sub-assembly according to this disclosure is configured such that the lens is formed on and monolithic-integrated into the SI-PD having a high refractive index, instead of the bulky glass lens used in the related art, thus allowing the receiver optical sub-assembly to be implemented in a small size.

Furthermore, the multi-channel receiver optical sub-assembly according to this disclosure is configured such that only the index matching transparent epoxy is applied to the section of the PLC chip polished at 45° and the upper and lower portions of the PD carrier made of the glass material without applying AR (Anti-Reflection) coating thereto, thus minimizing the effects of the optical reflection and reducing the cost of an AR coating process.

The multi-channel receiver optical sub-assembly according to this disclosure is configured such that the optical path is vertically arranged and the high frequency transmission line operated above 25 Gbps is horizontally arranged, thus minimizing impedance mismatch, suppressing a radiation loss occurring when the high frequency transmission line is vertically arranged, and preventing high frequency characteristics from being deteriorated, unlike the related art.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A multi-channel receiver optical sub-assembly comprising:
    a PLC (Planar Lightwave Circuit) chip having a first side into which an optical signal is received, a second side from which the received signal is outputted, a lower surface, and an upper surface, with an inclined surface formed on the second side of the PLC chip at a preset angle, the inclined surface extending from the lower surface of the PLC chip to the upper surface of the PLC chip;
    a PD (Photo-Diode) carrier bonded onto the PLC chip and made of a glass material, a lower surface of the PD carrier being in contact with the upper surface of the PLC chip;
    an SI-PD (Surface-Illuminated Photo-Diode) bonded onto the PD carrier, a bottom surface of the SI-PD being in contact with an upper surface of the PD carrier;
    a lens being arranged on a bottom of the SI-PD, forming a combination of the SI-PD and the lens;
    a first alignment mark and a second alignment mark provided on the upper surface of the PD carrier;
    a third alignment mark provided on the upper surface of the PLC chip; and
    an electrode pattern provided on the bottom surface of the SI-PD,
    wherein the PD carrier and PLC chip are passively aligned with each other, such that the first alignment mark of the PD carrier is aligned with the third alignment mark of the PLC chip, and
    wherein the PD carrier and the combination of the SI-PD and the lens are passively aligned with each other, such that the second alignment mark of the PD carrier is aligned with the electrode pattern of the SI-PD.

2. The multi-channel receiver optical sub-assembly according to claim 1, wherein the PLC chip is an AWG (Arrayed Waveguide Grating) PLC chip or a PLC chip on which a multi-channel straight waveguide is formed.

3. The multi-channel receiver optical sub-assembly according to claim 1, wherein the PLC chip further comprises a metal coated layer formed on the inclined surface.

4. The multi-channel receiver optical sub-assembly according to claim 3, wherein the metal coated layer comprises any one of Cr/Au, Cr/Ni/Au, and Ti/Pt/Au.

5. The multi-channel receiver optical sub-assembly according to claim 1, wherein the PD carrier comprises any one of quartz, sodalime glass, and BK7 glass.

6. The multi-channel receiver optical sub-assembly according to claim 1, further comprising:
a first SLC (Single Layer Capacitor) mounted on the PD carrier to be adjacent to the SI-PD and configured to remove a power supply noise of the SI-PD.

7. The multi-channel receiver optical sub-assembly according to claim 6, further comprising:
a first metal optical bench on which the PLC chip is mounted;
a second metal optical bench disposed on the first metal optical bench to be adjacent to the inclined surface;
a TIA (Transimpedance Amplifier) array mounted on the second metal optical bench to be adjacent to the SI-PD;
an RF-FPCB mounted on the second metal optical bench to be adjacent to the TIA array; and
a second SLC configured to remove a power supply noise of the TIA array mounted on the second metal optical bench,
wherein the SI-PD, the TIA array, and the RF-FPCB are arranged to be parallel to each other.

8. The multi-channel receiver optical sub-assembly according to claim 7, further comprising:
a high resistance submount formed between the first metal optical bench and the second metal optical bench to insulate the first metal optical bench and the second metal optical bench from each other.

9. The multi-channel receiver optical sub-assembly according to claim 1, wherein the PLC chip comprises:
at least one transverse alignment mark configured to perform transverse passive alignment with an optical waveguide provided on the PLC chip and the PD carrier.

10. The multi-channel receiver optical sub-assembly according to claim 1, wherein the first alignment mark includes:
at least one longitudinal alignment mark configured to perform longitudinal passive alignment with the PLC chip;
at least one transverse alignment mark configured to perform transverse passive alignment with the optical waveguide provided on the PLC chip; and
at least one longitudinal/transverse alignment mark configured to perform longitudinal/transverse passive alignment with the PLC chip, and
wherein the second alignment mark includes an alignment mark for flip-chip bonding configured to perform passive alignment with the SI-PD.

11. The multi-channel receiver optical sub-assembly according to claim 1, wherein the PD carrier is epoxy bonded onto the PLC chip by epoxy having index matching characteristics with the glass material constituting the optical waveguide and the PD carrier that are provided on the PLC chip.

12. The multi-channel receiver optical sub-assembly according to claim 1, wherein the SI-PD is flip-chip bonded onto the PD carrier and the SI-PD is a discrete chip type.

13. The multi-channel receiver optical sub-assembly according to claim 1, wherein the SI-PD is die bonded or flip-chip bonded onto the PD carrier and the SI-PD is an array chip type.

14. The multi-channel receiver optical sub-assembly according to claim 10, wherein the third alignment mark includes:
at least one PLC longitudinal alignment mark aligned with the at least one longitudinal alignment mark of the PD carrier; and
at least one PLC longitudinal/transverse alignment mark aligned with the at least one longitudinal/transverse alignment mark of the PD carrier.

* * * * *